Dec. 16, 1924.
J. E. DORMAN
GASOLINE GAUGE
Filed Oct. 29, 1923
1,519,366
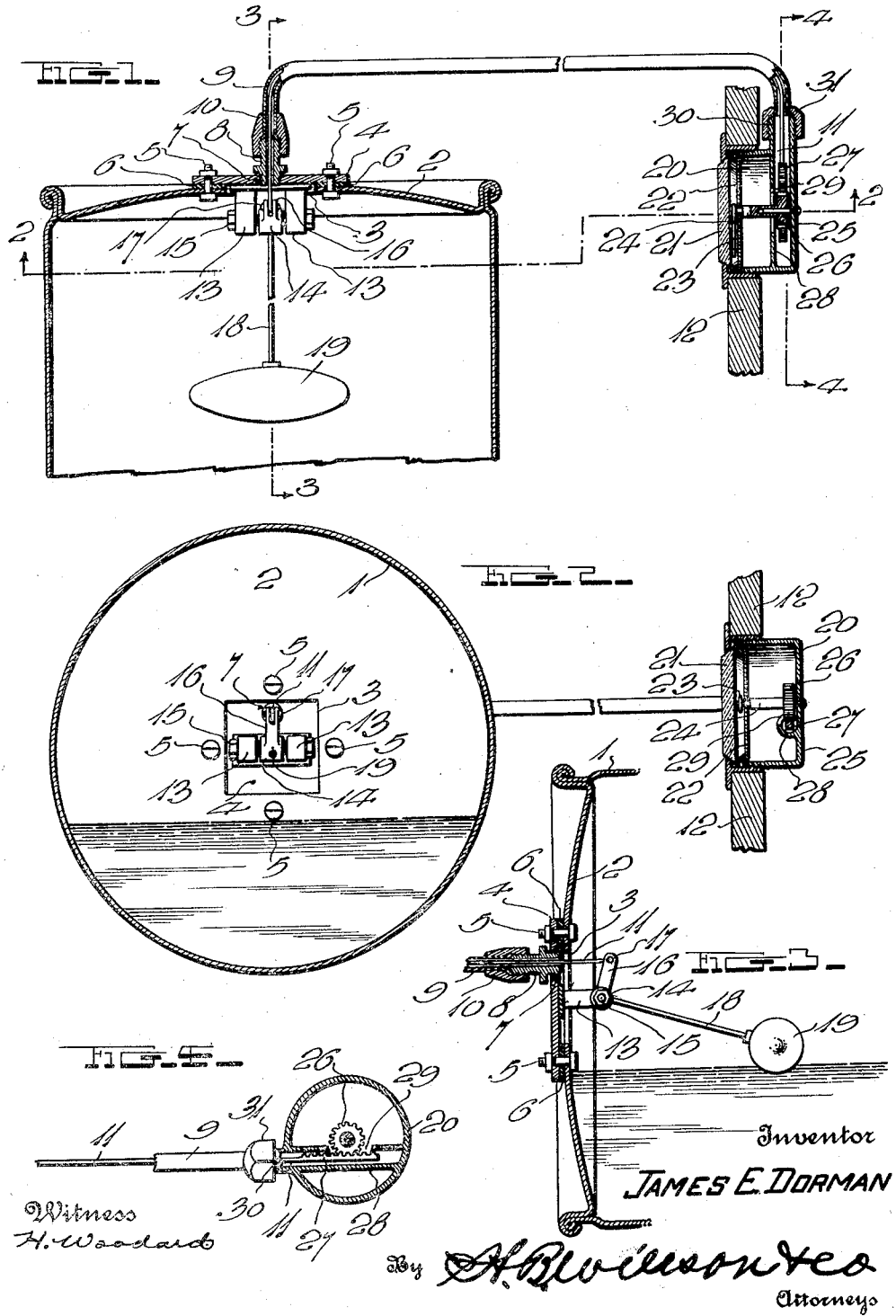
Inventor
JAMES E. DORMAN
Witness
H. Woodard
By H. B. Wilson &co.
Attorneys Patented Dec. 16, 1924.

1,519,366

UNITED STATES PATENT OFFICE.

JAMES ERWIN DORMAN, OF DETROIT, MICHIGAN.

GASOLINE GAUGE.

Application filed October 29, 1923. Serial No. 671,627.

*To all whom it may concern:*

Be it known that I, JAMES E. DORMAN, a citizen of the United States, residing at Detroit, in the county of Wayne and State of Michigan, have invented certain new and useful Improvements in Gasoline Gauges; and I do declare the following to be a full, clear, and exact description of the invention, such as will enable others skilled in the art to which it appertains to make and use the same.

This invention relates to a gasoline gauge for automobiles to accurately show the driver the amount of gasoline in the tank, without the necessity of leaving the seat. Numerous devices of this nature have been heretofore provided, but have proven of little advantage on account of complex constructions, difficult to install, and their liability to get out of order and give inaccurate readings, more detrimental than none at all. It is the object of my invention however, to provide an extremely simple, inexpensive and positive device having few working parts, and exceptionally easy to attach to any automobile.

With the foregoing in view, the invention resides in the novel subject matter hereinafter described and claimed, the description being supplemented by the accompanying drawing.

Figure 1 is a horizontal sectional view through a gas tank, an instrument board, and the improved gauge associated therewith.

Figure 2 is a vertical sectional view as indicated by line 2—2 of Fig. 1.

Figure 3 is an additional vertical sectional view on the plane of line 3—3 of Fig. 1.

Figure 4 is a detail vertical section on line 4—4 of Fig. 1.

In the drawing above briefly described, the numeral 1 designates a gasoline tank of an automobile, one of the vertical walls of this tank, preferably an end wall 2, being formed with an opening 3. A metal plate 4 is secured over the opening 3, by suitable bolts 5 or other desired means, and a gasket 6 is interposed between said plate and the tank to prevent leakage. The upper portion of the plate 4 is formed with an opening 7 into which a double-ended nipple 8 is threaded, and a wire guiding tube 9 of copper or other suitable bendable material is coupled to the outer end of the nipple 8 by a suitable coupling 10. Slidable within this tube, is a flexible wire 11 which is adapted to operate an indicator located on the dash 12 of the machine, or at any other suitable point. The construction of this indicator will be hereinafter described.

Suitably joined to the inner side of the plate 4 and extending inwardly from said plate, through the opening 3, are two horizontally spaced bearing arms 13. Between these arms, a hub 14 is located, and a pivot bolt 15 or other suitable pivot passes through the arms and hub to mount the latter for oscillation. This hub is provided with an upstanding crank arm 16 which is pivotally connected at 17 to the wire 11 and is also provided with a longer arm 18 having a float 19 to ride on the fuel in the tank 1. It will thus be seen that as the float is raised or lowered by the fuel in the tank, the arm 18 will turn the hub 14, thereby operating the arm 16 to move the wire 11 through the tube 9, for the purpose of operating the indicator.

The indicator carried by the instrument board 12, or other suitable part, is preferably of the construction shown in Figs. 1, 2 and 4. A cylindrical casing 20 is provided, said casing having a glass front 21 and a dial 22 intermediately behind said front, said dial co-operating with an indicating pointer 23. This pointer is carried by the front end of a rotatably mounted shaft 24 which extends from the dial to the back wall 25 of the casing 20.

At its rear end, shaft 24 is provided with a pinion 26 meshing with a horizontally movable rack bar 27 which is connected to the wire 11. For suitably guiding the rack bar 27, I have shown a tube 28 extending across the rear portion of the casing 20, said tube 28 receiving said rack bar 27 and having a notch 29 through which a peripheral portion of the pinion 26 passes. The casing 20 is provided with a nipple 30 in alinement with the tube 28 and the wire guiding tube 9 is connected with said nipple by a suitable coupling 31. It will be seen that movement of the wire 11, under the influence of the float 19, will cause the rack bar 27 and pinion 26 to operate the shaft 24 and pointer 23, thus accurately showing the amount of gasoline in the tank.

The construction of all parts is extremely simple and inexpensive and it will be obvious that the invention may be easily attached to any automobile. Due to its extreme simplicity, there is nothing about the device to easily get out of order and cause any trouble whatever and hence the present invention will be greatly advantageous over similar devices heretofore provided for the same purpose.

As excellent results have been obtained from the details disclosed, they are preferably followed, but within the scope of the invention as claimed, numerous minor changes may be made.

I claim:

An automobile gasoline gauge comprising a plate, means for attaching the plate to the outer side of a vertical wall of the gasoline tank over an opening in the latter, a wire guiding tube secured to and extending outwardly from said plate, a flexible wire in said tube extending beyond the inner side of said plate, a pair of bearing arms extending from the inner side of said plate in horizontally spaced relation, a hub between said arms, a pivot passing horizontally through said arms and hub, a crank arm extending from said hub and connected to said wire for sliding it in said tube, a float and a carrying arm of said float extending from said hub.

In testimony whereof I have hereunto affixed my signature.

JAMES ERWIN DORMAN.